UNITED STATES PATENT OFFICE.

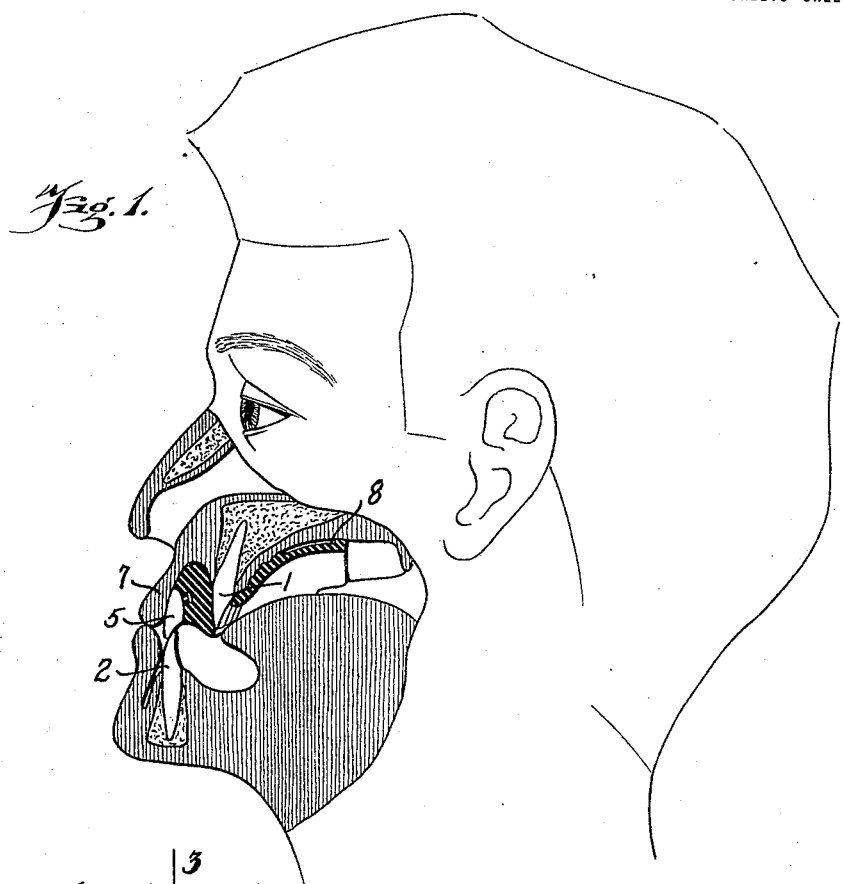
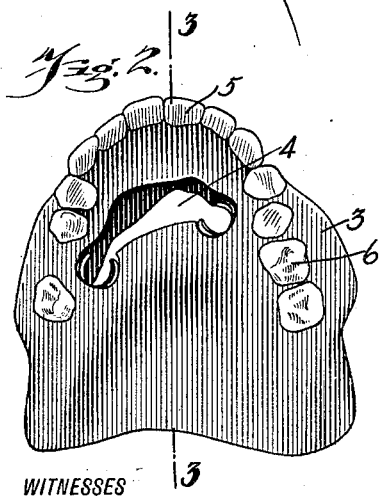
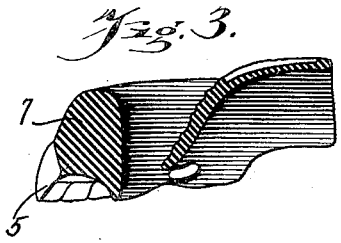
A. PIMIENTA.
DENTURE AND METHOD OF APPLICATION.
APPLICATION FILED DEC. 28, 1921.
1,417,345. Patented May 23, 1922.
2 SHEETS—SHEET 1.
INVENTOR
ALFREDO PIMIENTA
BY
ATTORNEYS

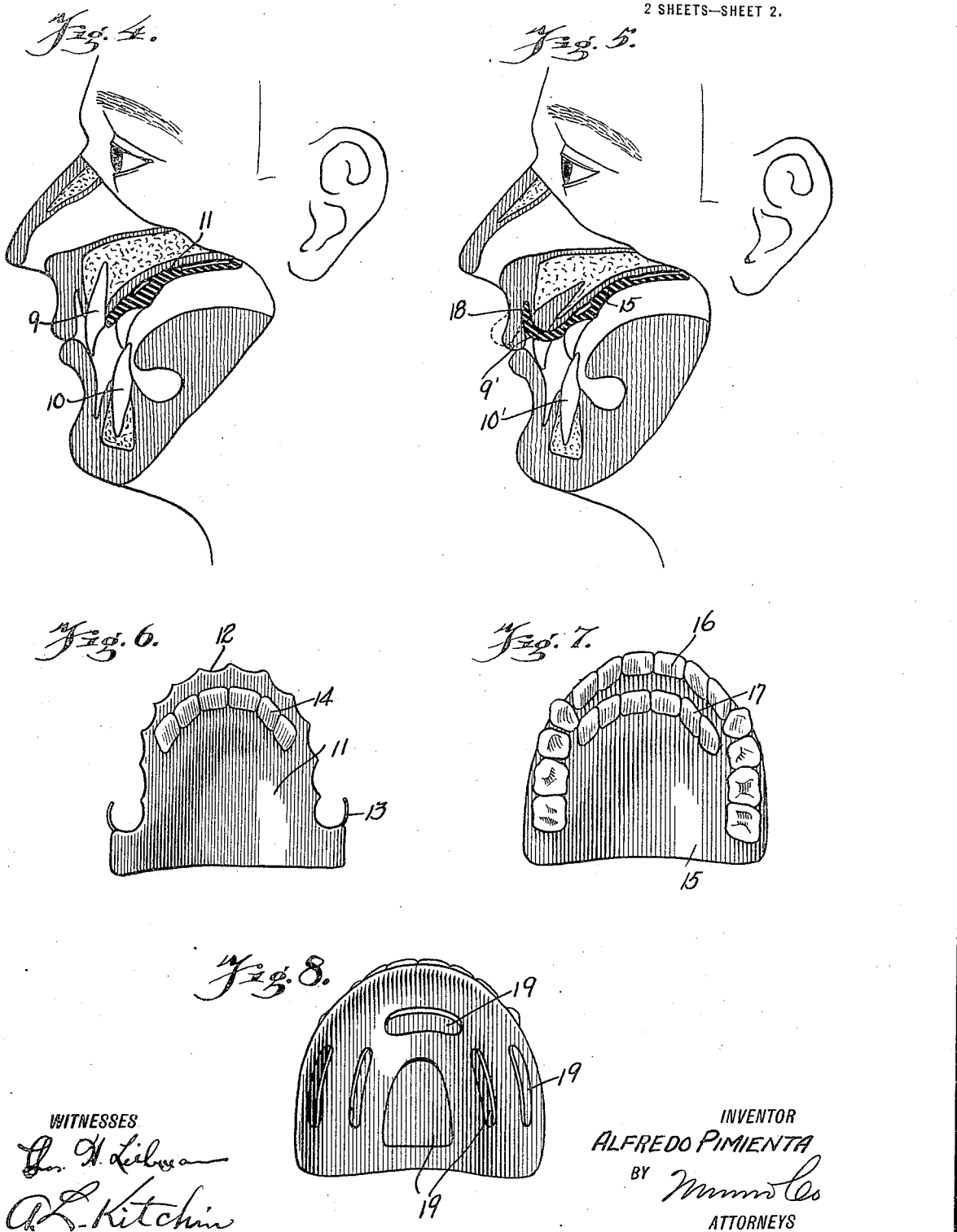

ALFREDO PIMIENTA, OF NEW YORK, N. Y.

DENTURE AND METHOD OF APPLICATION.

1,417,345. Specification of Letters Patent. Patented May 23, 1922.

Application filed December 28, 1921. Serial No. 525,324.

*To all whom it may concern:*

Be it known that I, ALFREDO PIMIENTA, a citizen of the United States, and a resident of the city of New York, borough of Manhattan, in the county and State of New York, have invented a new and Improved Denture and Method of Application, of which the following is a full, clear, and exact description.

This invention relates to an improved article and method used in the dental profession and has for an object to provide a denture and method of application whereby mis-shapen mouths and misplaced teeth may be adjusted or compensated for.

Another object in view is to provide a denture which will present one or more artificial teeth or one or more sets of artificial teeth designed to act alone or co-act with a set of teeth already in the mouth.

Another object in view is to correct the appearance of the mouth and face where a person has either protruding lower teeth or protruding upper teeth and to give the rounded appearance to the face as well as the appearance of correctly fitting upper and lower teeth.

In the accompanying drawings—

Figure 1 is a side view of a head with part of the face broken away, illustrating a denture and the method of application, disclosing one embodiment of the invention.

Figure 2 is a bottom plan view of the denture shown in Figure 1.

Figure 3 is a sectional view through Figure 2 approximately on line 3—3.

Figure 4 is a view similar to Figure 1 but showing a modified embodiment of the invention to that illustrated in Figure 1.

Figure 5 is a second modified embodiment of the invention to that shown in Figure 1.

Figure 6 is a bottom plan view of the denture shown in Figure 4.

Figure 7 is a bottom plan view of the denture shown in Figure 5.

Figure 8 is a top plan view of the denture shown in Figure 7.

In the dental profession, numerous difficulties are presented to a dentist including the arrangement of natural teeth in other than the regular manner and in some instances accidents will cause a shifting of the teeth which will prevent a proper functioning thereof. In the present invention, a denture has been provided which may by certain embodiments, be caused to take care of different situations in regard to the position of the teeth in the mouth.

In Figure 1 of the drawing, a head has been shown wherein through accident, part of the upper jaw has been pushed back so that the natural front teeth 1 will be further back than the natural lower front teeth 2, which lower front teeth are in the correct position. When the teeth through an accident or through the actual nature are arranged as shown in Figure 1, a biting action with the front teeth cannot be made even though some or all of the molars function properly. In order to obviate this long registry, a denture 3 is provided which is provided with an opening 4 as shown in Figure 2 for accommodating the upper natural teeth 1 and a series of front artificial teeth 5 arranged to properly register with the lower teeth 2. Any desired number of molars 6 is provided as part of the denture to co-act with the remaining molars in the mouth. If necessary, some of the molars or other natural teeth may be pulled though ordinarily the denture is made with depressions or apertures similar to aperture 4 for accommodating all of the natural teeth.

It will be noted from Figures 1 and 3 that the front part of the denture is made comparatively thick at 7 and said thickened portion is arranged in front of the natural teeth 1 whereby an upper lip is forced forward into a substantially natural position in respect to the lower lip. It will be noted that the artificial teeth 5 are directly in front of the natural teeth 1 and preferably extend a short distance there below so that when the mouth is opened a short distance, the natural teeth 1 cannot be seen but only a small part of the artificial teeth 5 and a small part of the natural teeth 2. This arrangement of denture allows a person to bite with the front teeth and to use the molars in the usual manner either in connection with artificial molars or alone. The denture as shown in the drawing, is provided with usual vacuum cups or depressions 8. It is, of course, understood that for different conditions the denture must be modified in shape while still retaining the idea of making the front teeth register.

In Figures 4 and 6 will be seen a modified structure where the front teeth 9 are set an appreciable distance ahead of the bottom teeth 10. The teeth which are naturally arranged in this manner cannot meet and, consequently, a person cannot bite with his front teeth. The result is that both the upper and lower front teeth are useless as far as biting food is concerned. In order to secure proper biting, a different form of denture to that shown in Figure 2 is provided though embodying the same principles. The denture 11 shown in Figure 6 is used in connection with the arrangement of teeth illustrated in Figure 4. This denture is provided with recesses 12 adapted to fit against the front teeth and certain ofthe side teeth while preferably metallic spring clamps 13 fit around certain of the jaw teeth. The artificial front teeth 14 on this denture are arranged so as to be in back of the natural front teeth 9 but positioned to properly register with the natural lower front teeth 10. In this form of the invention, the artificial teeth are not seen at all in case the mouth is open though they co-act with the natural teeth 10 for biting. In the form of the invention shown in Figure 1, the artificial teeth are seen in case the mouth is open while the upper natural teeth are not seen.

In Figures 5, 7 and 8, will be seen another arrangement of denture to take care of different arranged natural teeth. The front teeth shown in Figure 5 are offset in a similar manner to that shown in Figure 4 but the upper teeth 9′ project outwardly while the lower teeth 11′ are substantially the same as illustrated in Figure 4. Where the teeth project outwardly at a forty-five degree angle or some other undesirable angle they will naturally not meet the lower teeth 10′. To take care of this situation, the front teeth 9′ are preferably removed and a denture 15 as shown in Figure 7 provided. This denture has a row of front teeth 16 which take the place of the teeth 9′ and an inner row of front teeth 17 adapted to register with the lower front teeth 10′ whereby a bite is secured. The denture shown in Figure 7 is shown as provided with a number of molars but this is not essential if the natural molars are properly arranged. The idea in this form of the invention is the same as the other forms, namely, to provide registering teeth for producing a proper bite and at the same time to give a proper appearance to the lips and face in general.

From Figure 5 it will be noted that the denture 15 is provided with an upturned portion 18 snugly fitting back of the upper lip though allowing the upper lip to come down and properly meet the lower lip which could not be done when the natural teeth 9′ were in place. In this form of denture, preferably a number of depressions or vacuum cups 19 are provided to hold the denture in place not only at the top but also at the front and sides.

What I claim is:—

1. A denture comprising a plate formed with an opening for receiving certain natural teeth when the denture is in use, and a number of artificial teeth arranged in front of said opening, said artificial teeth being so positioned that when the denture is in use they will register with the oppositely positioned natural teeth.

2. In a denture of the character described, a plate having an opening for receiving certain of the front teeth of a person when the denture is in use, means on the plate for gripping certain of said front teeth, and a set of artificial teeth arranged in front of said opening, said artificial teeth conforming generally to the natural teeth positioned in the opening but registering with the oppositely positioned natural teeth of the person wearing the denture.

3. A denture of the character described comprising a plate for the upper part of the mouth, said plate having an opening therein spaced from the front of a size and shape to receive certain of the front teeth when the plate is in use whereby part of the plate will be in front of the upper and natural teeth, and a plurality of artificial teeth arranged on the front part of said plate and positioned to register with the lower front teeth when the denture is in use.

4. In a denture of the character described, a plate adapted to fit the upper part of the mouth, said plate having a plurality of indentations comforming to the shape of the inner part of the front teeth of a person using the denture, means for holding said plate in position in the mouth, and a set of front artificial teeth carried by the plate spaced from the front edge, said artificial teeth being positioned to register with the lower natural teeth of the person using the denture.

5. A denture of the character described comprising a plate adapted to fit the upper part of a mouth, said plate having two sets of front teeth, one of said sets being positioned to register with the lower natural front teeth when the plate is in use.

6. In a denture of the character described, a plate formed to fit the upper part of the mouth and with a front upwardly curved section fitting in back of the upper lip, a set of front teeth carried by said front section, and a set of teeth carried by the plate back of the first mentioned front teeth, said section mentioned teeth being positioned to register with the lower natural teeth of the person wearing the denture.

ALFREDO PIMIENTA.